United States Patent

[11] 3,590,838

[72] Inventor Charles E. Brady
Bloomfield Hills, Mich.
[21] Appl. No. 553,518
[22] Filed May 27, 1966
[45] Patented July 6, 1971
[73] Assignee Chrysler Corporation
Highland Park, Mich.

[54] SPEED-RESPONSIVE CENTRIFUGAL MASS TYPE GOVERNOR
3 Claims, 2 Drawing Figs.
[52] U.S. Cl. ............................................. 137/56
[51] Int. Cl. ....................................... G05d 13/26
[50] Field of Search ........................... 137/56, 47, 53, 54; 73/535, 537; 251/181

[56] References Cited
UNITED STATES PATENTS
1,329,385  2/1920  Egger ............................. 137/56 X
2,697,363  12/1954  Sheppard ........................ 137/56 X
2,738,650  3/1956  McAfee ........................... 137/56 X
2,911,987  11/1959  Wayman .......................... 137/56 X
2,738,799  3/1956  Mueller .......................... 251/181 X Primary Examiner—Clarence R. Gordon
Attorney—Harness and Harris ABSTRACT: A governor mounted on a rotatable shaft including a rod extending through the rotatable shaft with a valve member on one end and a weight on the opposite end. A spring having a nonlinear low-deflection curve extends between a seat on the other end of the shaft and the weight to oppose the centrifugal force exerted on the valve in such a manner that the net centrifugal force on the valve is approximately linearly proportional to the rotational speed of the shaft.

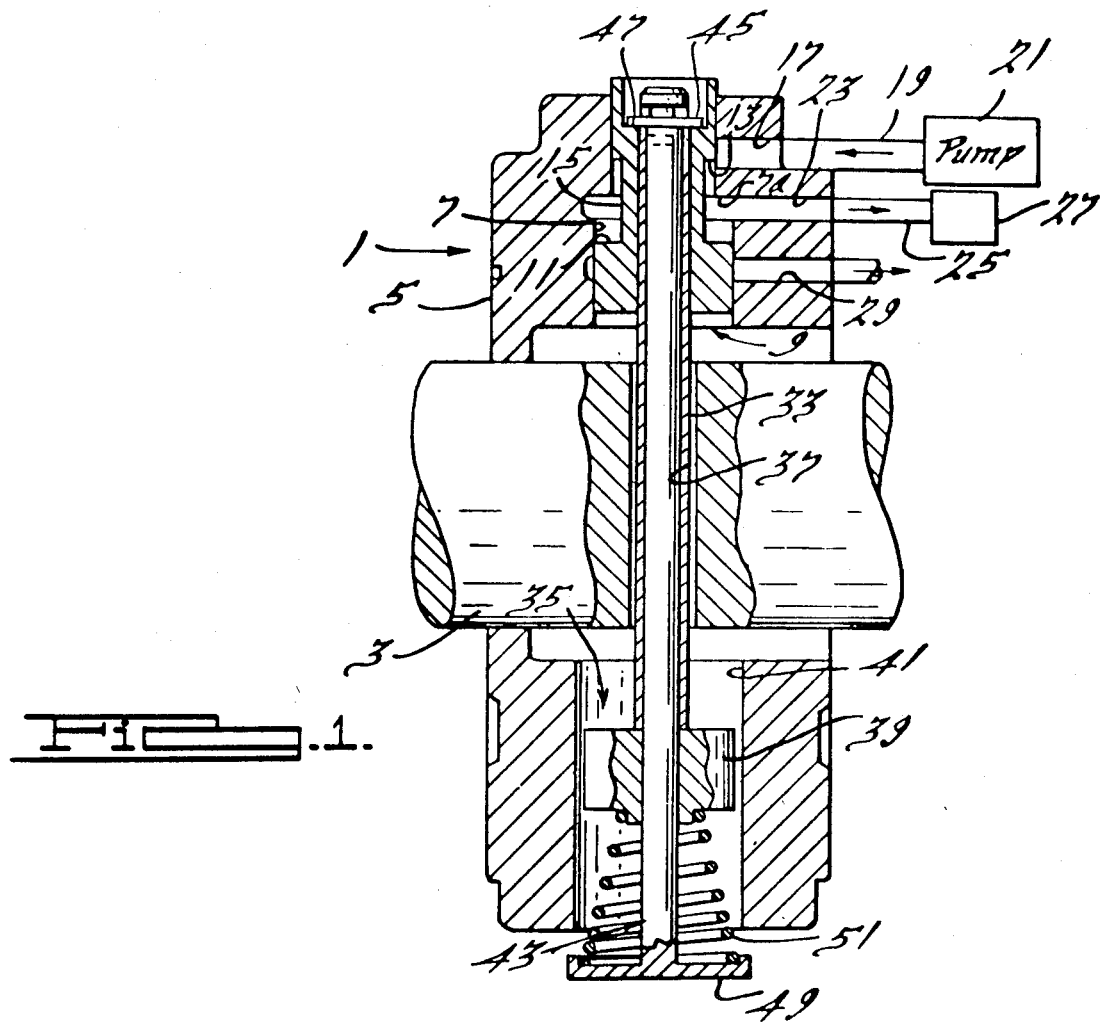

SPEED-RESPONSIVE CENTRIFUGAL MASS TYPE GOVERNOR

This invention relates to centrifugal force operated hydraulic governors, and more particularly to a hydraulic governor wherein the governor pressure-speed curve is of substantially straight line or linear configuration over a relatively wide speed range.

Hydraulic governors currently used in automatic transmissions are of a nonlinear type in which the governor pressure is a function of the square of the revolutions per minute of the transmission output shaft. The governor pressure-speed curve of such governors is parabolic. Normally, the curve is improved by bottoming out governor weights at one or more midspeed points to piece together two or more parabolic curves, thereby lowering the slope of the total curve and providing a more proportional governor pressure-speed relationship. However, the multiparabolic governor pressure-speed curve of each of these governors has wide variations in slope throughout the speed range, and particularly around the points at which two parabolic curves are joined together. These variations in slope, which are synonymously referred to as variations in sensitivity, result in transmission shift points, particularly in the midspeed range, which are not as sharply defined as desired.

Accordingly, it is a primary object of this invention to provide a hydraulic governor wherein the governor pressure-speed curve is substantially linear over a relatively wide speed range, thereby providing relatively constant sensitivity characteristics.

Another object of this invention is to provide a hydraulic governor of the type described wherein the transmission shift pattern in the midspeed range is considerably extended.

Still another object of this invention is to provide a hydraulic governor that is particularly adapted for use as a speed-responsive control of a hydraulically controlled motor vehicle power transmission unit.

Other objects of the invention will become apparent as the description progresses.

In the accompanying drawings in which one of various possible embodiments of this invention is illustrated;

FIG. 1 is a vertical sectional view of a hydraulic governor of this invention with certain connecting elements shown schematically; and FIG. 2 is a graphical illustration of a governor pressure-speed curve and factors bearing thereon for the governor shown in FIG. 1.

Referring now to the drawings, a hydraulic governor of this invention, generally indicated at 1, is drivingly connected to a rotatable shaft 3, such as the output shaft of an automatic transmission by conventional connecting means (not shown). Governor 1 comprises a body 5 having a radially extending T-shaped or stepped cylinder or bore 7 in which a piston or slide-type governor control valve 9 is reciprocably mounted. Control valve 9 has spaced lands 11 and 13 of different diameters connected by a narrower neck portion 15.

Governor body 5 is formed with a pressure fluid inlet 17 connected by a conduit 19 to a source of pressure fluid, such as a pump 21 driven by the input and/or output shafts of a motor vehicle automatic power transmission. Pump 21 is adapted to supply a system pressure fluid, herein referred to as "line" pressure fluid to inlet 17. A first pressure fluid outlet 23 is provided in body 5 and is adapted to receive fluid from inlet 17 which passes valve 9. The pressure of fluid in outlet 23 is herein denoted "governor" pressure and such pressure is transmitted through fluid in a conduit 25 to a particular pressure fluid operated device 27 such as a transmission shift valve, that is to be responsive to the rotational speed of shaft 3. Also connected to the valve bore 7, through body 5, is a vent conduit or pressure fluid relief port 29.

Valve 9 is bored as indicated at 31 for receiving an elongated tubular portion 33 of T-shaped weight 35 which forms part of a weight means 36. Tubular portion 33 extends through a diametrically extending bore 37 in shaft 3 to head 39 portion which is slidably received in a bore 41 in body 5.

A tie bar or stem 43 extends through tubular portion 33 and is provided at one end with a retained washer 45 seated on counterbored seat 47 in valve 9. The other end of stem 43 is formed with a seating member 49. Extending between seating member 49 and head 39 of weight 35 is a variable rate or nonlinear spring 51 adapted to provide a predetermined variable resistance to the outward movement of weight 35. Spring 51 also forms part of the weight means 36. The load-deflection curve of spring 51 is such that the weight 35 is permitted to move radially outward, downward as viewed in FIG. 1, a different predetermined amount for each different rotational speed of shaft 3 as described hereafter.

As will be understood, pressure fluid is adapted to be admitted from inlet 17 past the cracked pressure-regulating valve 9 to the governor outlet 23 and the device 27. The vent 29 in the valve body 5 is arranged so that "governor" pressure fluid in the valve bore 7 may be vented to insure the lowering of governor pressure to zero when the shaft speed is brought to zero. This will become more apparent from the subsequent description.

The manner in which the aforedescribed device functions as a hydraulic governor is as follows:

When the shaft 3 is at rest or is rotating at very low speeds the valve 9 is slightly radially inward from the position shown in FIG. 1 so that "line" pressure port 17 is blocked by valve 9, while ports 23 and 29 are in communication with one another. As the speed of shaft 3 increases, centrifugal force acting on the valve 9 tends to move it radially outwardly in bore 7 to a position wherein the valve land 13 has cracked open inlet 17. The centrifugal force acting on the valve 9, which includes the stem 43 and its parts, increases at a rate proportional to the square of the shaft speed. As the valve land 13 cracks open inlet 17 "line" pressure fluid in inlet 17 can pass into bore 7 around neck portion 15 and into "governor" outlet 23. The pressure fluid in the bore 7 around neck 17 reacts on the valve body portion 7a against land 11 and tends to urge the valve 9 radially inward to close off the pressure fluid supply from inlet 17. If it were not for the hereafter-described functions of the weight 35 and variable-rate spring 51, the force required to be exerted by the fluid pressure reaction between portion 7a and land 11 close off the inlet 17 would be equal to the centrifugal force on the unit comprising valve 9, and stem 43, which as mentioned previously is proportional to the square of the speed of shaft 3.

The centrifugal force exerted by weight means 36, which includes the weight of spring 51, opposes the centrifugal force on the valve 9. The centrifugal force on the weight means is based partially on the distance between the center of gravity of the weight means and the axis of rotation of shaft 3. By the use of the predetermined variable-rate spring 51, this distance may be limited to such that the centrifugal force on weight means 36 which opposes the centrifugal force on valve 9 results in a new outward centrifugal force on valve 9 which is substantially proportional linearly to the speed of shaft 3, rather than to the square of the speed of the shaft. That is, the variable-rate spring is designed to limit the centrifugal force on weight means 36 (by limiting the outward movement of weight 35) at any given speed to be less than the centrifugal force on valve 9 by an amount substantially equal to a force linearly proportional to the speed of shaft 3. Throughout the speed range, from low to high speeds, the total deflection of variable rate spring gets progressively larger, with the additional amount of deflection between equal speed changes getting progressively smaller. The specific spring requirements which may be conventionally calculated, are dependent upon the selection of the valve 9 and stem member 43 and their combined weights, and weight means 36, as well as the location of the centers of gravity of these units.

The amount of spring deflection necessary to obtain the desired centrifugal force on weight means 36 for any particular speed may be readily calculated by first calculating the centrifugal force which will be exerted on valve members 9 and 43 for various particular speeds, including a high and a low speed. The amount of force needed to offset the centrifugal force on the valve members to produce the linear relationship between governor pressure or force and speed is then determined. Having selected, and knowing the weights of the materials for the weight means 36, including the approximate weight of spring 51, the position of the center of gravity of the weight means necessary to produce the centrifugal force required for offsetting the centrifugal force on valve members 9 and 43 may then be determined. The changes in position of this center of gravity for progressively different speeds is dependent upon the amount of spring deflection necessary for operation, and a spring having the required characteristics to produce such deflection may then be selected.

As a result, the pressure fluid reacting on the valve body portion 7a against land 11 is proportional linearly, to the speed of shaft 3. The pressure of this fluid is the "governor" pressure to which the device 27 is responsive.

After the land 13 initially cracks open inlet 17 and pressure fluid passes from the inlet into bore 7 and governor outlet 23, the combined forces produced by the fluid pressure reacting on portion 7a and the centrifugal force on weight means 36 tend to close the inlet 17. However, at the same time that the pressure fluid in bore 7 and the centrifugal force on weight means 36 are tending to close inlet 17, there is simultaneously applied centrifugal force acting on valve 9 which tends to move the valve radially outwardly and open the connection of the "line" pressure in inlet 17 to the bore 7 and outlet 23. It will thus be seen that radial movement of valve 9 is the resultant of two unequal centrifugal forces opposing each other with a third force, created by fluid pressure, aiding the smaller of the centrifugal forces in opposing the other centrifugal force. As a result valve 9 functions as a pressure-regulating valve. The valve 9 reciprocates radially until an equilibrium is established between the forces acting thereon for each speed of shaft 3. When valve 9 is in equilibrium the pressure in "governor" outlet 23 is linearly proportional to the speed of shaft 3 and may be used to actuate any type of shaft speed responsive device 27.

If, after the valve 9 attains equilibrium, the speed of shaft 5 increased, the valve 9 is moved outwardly to crack open the "line" pressure inlet 17 and admit additional pressure fluid to bore 7 and outlet 23. The pressure applied against land 11 is determined by the net outwardly directed force on valve 9, i.e., the force remaining on valve 9 after the total centrifugal force on valve 9 is offset by the centrifugal force on the weight means 36. As set forth previously, the variable-rate spring 51 permits the weight 35 to move outwardly only a predetermined amount for each speed, thus providing a centrifugal force of such value acting against the centrifugal force on valve 9 that the outwardly directed force remaining on valve 9 is substantially linearly proportional to the speed of shaft 3. The fluid or "governor" pressure is thus also substantially linearly proportional to the speed of shaft 3, and will urge valve 9 inwardly until a condition of equilibrium is established for the increased shaft speed.

It will be seen that the radially reciprocating valve 9 functions as a pressure-regulating or pressure-reducing valve to connect the system or "line" pressure in inlet 17 to a speed-responsive "governor" pressure in bore 7 and outlet 23. The pressure of the fluid trapped in bore 7 and outlet 23 is proportional to the speed of shaft 3 in a straight line or linear fashion. If the speed of shaft 3 should decrease then the centrifugal forces on valve 9 and weight 35 are reduced and the valve 9 moves inwardly to completely block inlet 17 and eventually at low shaft speeds, place outlet 23 in communication with vent 29, thereby lowering the pressure in the bore 7 and outlet 23. It will thus be seen that the pressure of fluid trapped in bore 7 and outlet 23 is directly proportional to the speed of shaft 3 in a linear manner, rather than exponentially.

A governor pressure-speed curve for the governor of this invention is graphically and diagrammatically illustrated in FIG. 2. The vertical axis above O represents governor pressure ($P_G$) and below O represents a negative force applied to valve 9 by weight means 36 while the horizontal axis represents revolutions per minute (r.p.m.) of shaft 3. Line A represents the pressure-speed curve which would be obtained if the valve 9 only were used in the governor. The governor pressure in such case is a function of the square of the speed of the shaft 3. The slope of this curve varies from gentle at the low-speed range to very steep in higher speed ranges. A relatively large change in speed in the low-speed range produces very little governor pressure change, while a very small change in speed in the higher speed range produces a relatively large governor pressure change. This variance makes the control of shift points throughout the entire range rather difficult. To improve the curve an additional weight or weights are usually provided and are adapted to bottom out at one or more midspeed points to piece together two or more parabolic curves, thereby lowering the slope of the total curve. Curve B, which is curve OXY is a double weight pressure-speed curve, however, this curve also has wide variations in its slope, particularly around point X. It will be noted that just to the left of point X, small speed changes result in substantial governor pressure changes, while just to the right of point X, even substantial speed changes result in very little governor pressure change. Thus, transmission shift points in this area are not as sharply defined as desired.

Line C represents the counterforce exerted on valve 9 by the weight means 36. This force is negative and because the position of the weight 35 is determined by the nonlinear spring 51 for each rotational speed of shaft 3, the total negative force is such that the net outward force on valve 9 is substantially linear, and thus the governor pressure required is also linear. The result of the weight means 36 and the action of the nonlinear spring thereon is graphically illustrated by the line D. By imposing a preload on spring 51, the initial low-speed end of the governor curve can be made to follow a parabola until the centrifugal force of weight means 36 overcomes the spring preload. The actual slope of the governor pressure speed curve will be determined by the difference in area between lands 11 and 13, if the variables, such as the weights of the valve 9, stem 43, and weight means 36, and the variable rate of spring 51 are known.

It will be seen that line D is substantially linear and that the slope thereof does not fluctuate significantly. The shift points for a transmission to which this governor is attached are clearly defined and the sensitivity of the device remains constant throughout the complete speed range, thus resulting in better control of the transmission shift points.

I claim:

1. A governor adapted to be mounted on a rotatable member and connected to a source of pressure fluid comprising a valve cylinder having a pressure fluid inlet and a pressure fluid outlet, a valve unit reciprocably mounted in said cylinder and arranged to control the passage of pressure fluid from said inlet to said outlet, said valve unit being moved radially by centrifugal force, and weight means comprising a weight adapted for radial movement by centrifugal force, said weight means having means connecting said weight to said valve unit for applying the centrifugal force on said weight means against the centrifugal force on said valve unit to obtain a net outward centrifugal force on said valve unit approximately linearly proportional to the rotation speed of said rotatable member, said valve unit comprising a valve member having a bore extending longitudinally therethrough, said weight including an elongated member having one end extending into said bore, and said elongated member extending through said rotatable member and having a head on the other end thereof.

2. A governor as set forth in claim 1 wherein said elongated member is hollow, said valve unit further comprising stem means abutting said valve member at one end of said stem means and extending through said elongated member, said stem means having a seating member on the other end thereof, said means connecting said weight to said valve unit comprising a resilient member extending between said seating member and said weight.

3. A governor as set forth in claim 2 wherein said resilient member comprises a spring having a nonlinear deflection rate for restraining outward movement of said weight to reduce the centrifugal force on said weight means below the centrifugal force on said valve unit by an amount sufficient to produce said net outward centrifugal force on said valve unit.